Jan. 10, 1956  S. FISHER ET AL  2,730,600
ROTATING ELECTRODE STRUCTURE
Filed May 8, 1953

INVENTORS
SIMON FISHER
THADDEUS S. KURLINSKI
BY
LAURENCE, VANDERKELEN AND MILLER
ATTORNEYS

United States Patent Office 2,730,600
Patented Jan. 10, 1956

2,730,600

ROTATING ELECTRODE STRUCTURE

Simon Fisher and Thaddeus S. Kurlinski, Bay City, Mich., assignors to National Electric Welding Machines Co., Bay City, Mich., a corporation of Michigan Application June 8, 1953, Serial No. 360,124

5 Claims. (Cl. 219—4)

The present invention relates to a new and improved rotating electrode structure and more particularly to sliding wedge contactors within the housing of such a structure which are wear compensating, relatively free from arcing, and independent of any load bearing effects upon said rotating electrode and its shaft.

For many years electric resistance welding machine builders have experimented with means for carrying heavy electrical currents to rotating electrodes such as are used in seam welders, for example.

The basic problem involved has been that of transmitting to a rotating electrode relatively high welding currents with a minimum of power loss by means which will also minimize attendant heat generation, arcing, and wear. Coolant means were devised, insulation positioning and elements were improved, various conductor type sleeve bearings were evolved, and combinations of frictionless bearings and sleeve contactors were developed. To surmount the obstacle of arcing between stationary conductor and rotating shaft, contactor plates were used to transmit current directly to the electrode, by-passing conduction through the electrode shaft. None of these developments to date have been altogether satisfactory. Arcing continued, which, combined with mechanical wear upon the conductors or contactors, caused pitting between contactor and surface to be contacted. Utilization of the contact area provided by the rotating shaft by means of sleeve bearings was the most desirable approach but sleeves tended to wear and pit. "Down-time" for replacing sleeves became increasingly serious to production welders. In addition high conductivity and high hardness are practically unobtainable in power transmitting contact material. The soft materials which must be used to carry the high currents wear rapidly requiring frequent replacement so as not to result in changes in the welding characteristics of the welding machine.

It is therefore an object of this invention to provide a wear-compensating contactor having high conductivity which is independent of any load carrying function and which conducts welding current through the shaft to the electrode.

An additional object is to provide contactors having high conductivity characteristics which act against the welding electrode shaft with sufficient resilient force to maintain close contact with the shaft thereby eliminating considerable arcing and maximizing the life of the contactors.

Another object is to provide a wear compensating contactor which is independent of the welding force required to complete the weld. This object is of particular importance where relatively low welding forces are required with high welding current. In conventional sleeve bearing type contactors the welding force is utilized to reduce contact resistance in the bearing. In such structures, satisfactory results are obtained where the welding force is relatively great but difficulties are encountered where the welding force is relatively small.

A further object is to make possible a structure which allows maximum clearance for the material being welded by minimizing the size of the housing containing the electrode structure and contactors.

A still further object is to mount the welding wheels with the accuracy of alignment and closely held tolerances possible with anti-friction roller or ball bearings. It is a common fault with the conventional sleeve bearings that, because of excessive heating and expansion, abnormally large clearances between shaft and bushings must be allowed. This results in poor axial and radial location of the wheels which condition cannot be tolerated in some welding jobs.

These and other objects will become apparent to those familiar with the welding art as the description proceeds.

General description

In general a housing is provided which may be secured to a welding machine structure. The housing provides mountings for anti-friction bearings at either end. A shaft is journaled in said bearings. The shaft extends from said housing and a rotating electrode or welding wheel is removably attached to one end thereof. Coolant passages are provided running through the said housing. The shaft is also adapted to receive and circulate coolants therethrough. The electrode may or may not be provided with coolant means. Intermediate the aforementioned bearings and inside the housing are cradle-like contactor blocks which may be provided with raised contacting portions in the cradle face which engage the rotating shaft as the rotating electrode is moved. The contactor blocks are provided at their backs with an angular planal cut. The blocks are held in position and aligned by means of guide pins which run transversely through the housing and through the contactor blocks. Sliding wedges planally parallel and mating the angular planal cut of the contactor blocks are disposed behind each contactor block and matingly engaged therewith. The outermost side of said sliding wedges parallel and are in sliding contact with the coolant jacketed walls of the housing. Recessed cups are provided along the base of the sliding wedges. Corresponding recesses are provided in the housing base member. Means are inserted in the cups to urge the sliding wedge upward reacting against the housing base member. As wear occurs upon the contactor faces the sliding wedges assure continuing contact between the contactor blocks and shaft and provide a vibratory cushion preventing a gapping between the contactor face and the shaft. The welding current passes through the housing and wedge to the contactors and thence along the shaft to the rotating electrode. The anti-friction bearings are insulated from electrical contact with the housing and engage the shaft to assure proper transmission of radial and thrust loads.

Specific description

Figure 1:
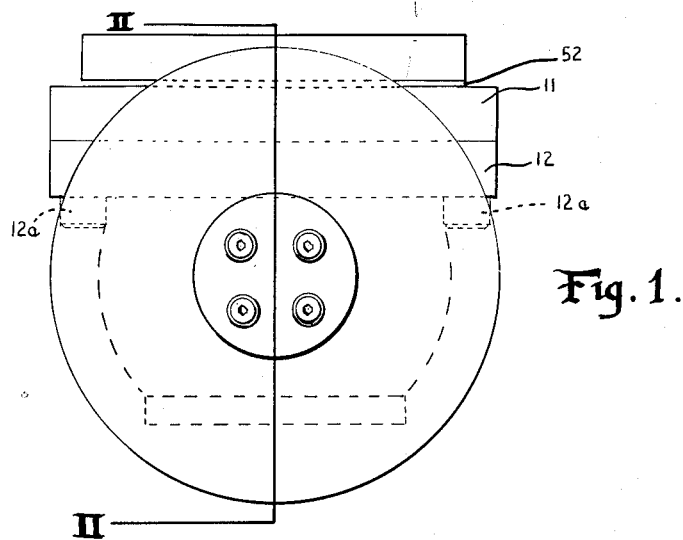
Figure 1 is a front elevation of the rotating electrode structure.
Figure 3:
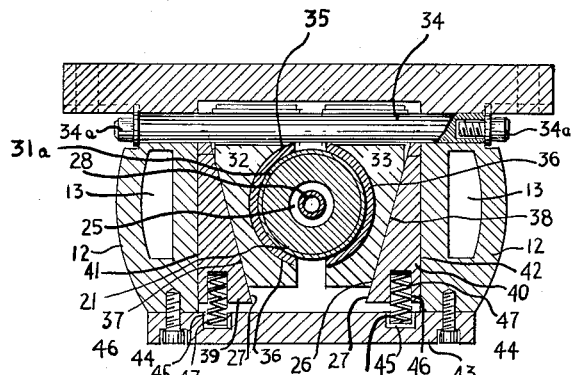
Figure 3 is a cross-section view taken through the rotating electrode structure along line III—III of Fig. 2.
Figure 2:
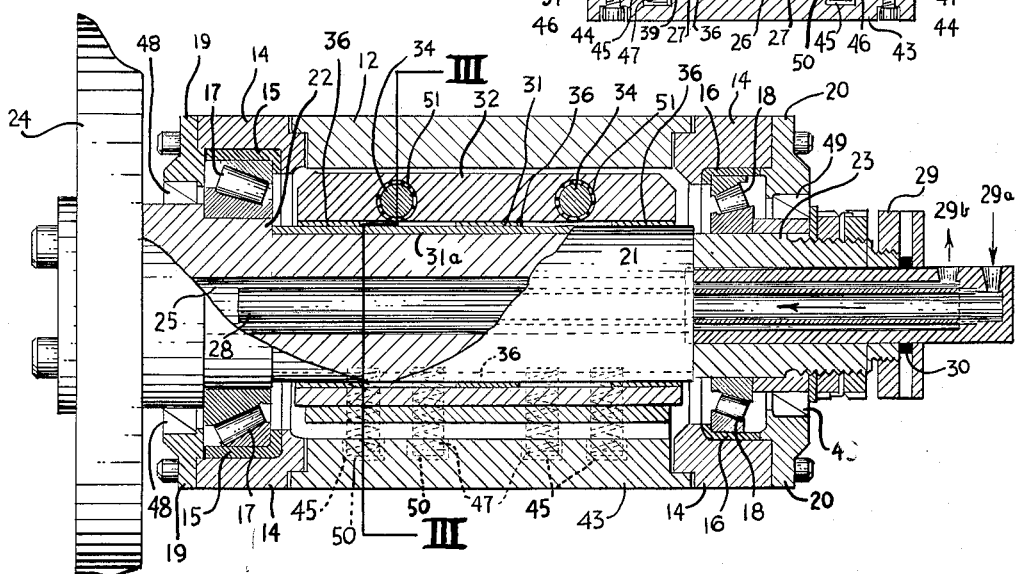
Figure 2 is a side cross-sectional elevation of the rotating electrode structure taken on line II—II of Fig. 1.

Referring more particularly to the drawing a welding machine member 11 is partially shown in Fig. 1 to which the housing 12 is attached as by bolts 12a. The rotating electrode structure described can be mounted upon a welding machine (not shown) for movement such as reciprocation or for static positioning. The housing 12 consists of an open bottomed coolant jacketed casting, the coolant passages 13 being shown best in Fig. 3. A pair of bearing fixtures 14 are disposed at either end of said housing 12 to shoulder thereagainst and provide a housing seat for insulation bushings 15 and 16 and anti-friction bearings 17 and 18. The bearings 17 and 18 are shown as tapered roller bearings and were selected for maximum loading capacities. Ball bearings may be provided which are of the combination thrust and radial varieties. Bearing plates 19 and 20 secure the bearings 17 and 18 in the housing 12. A shaft 21 extends through the housing 12 and is journaled in the bearings 17 and 18. The shaft 21 is provided with steps 22 and 23 having a diameter to accommodate bearings 17 and 18. The smooth central step 31 of the shaft 21 is of a lesser diameter than step 22 and of a greater diameter than 23 for facilitating assembly and disassembly. The anti-friction bearing 22 carries the predominant share of thrust load to the housing 12 and bearing 23 assures that radial loading will be taken care of as well as thrust. The shaft 21 extends outside of said housing 12, bearing retainer 14, and plate 19, and has attached to one end a rotary electrode or weld wheel 24. The weld wheel 24 may be bolted or otherwise attached to the shaft 21, bolts being shown for illustrating one satisfactory form. The shaft 21 is provided with an axial bore 25 running the length of said shaft which provides a shaft coolant circulatory passage. A coolant tube 28 runs through the shaft 21 concentric with the shaft axis and extends with the shaft 21 beyond the rear of the housing 12, opposite the electrode end. A coolant gland 29 with seal 30 is attached to the shaft 21 and is provided with a coolant inlet 29a and outlet 29b. Intermediate said bearings 17 and 18 a smooth portion 31 of the shaft 21 is provided for a contact area located centrally inside the housing 12. This contact area in some instances may require a contact sleeve 31a shrunk into position upon the shaft 21 and fashioned from material having good conducting characteristics. A pair of cradle-like contactor blocks 32 and 33 extend longitudinally along either side of the smooth portion 31 of the shaft 21. Guide pins 34, through the housing 12, extend through the contactor blocks 32 and 33 transversely and above the shaft 21 serving to hang the blocks 32 and 33 and to align the said blocks longitudinally upon either side of the shaft 21. The guide pins 34 are restrained from axial movement by means of bolts 34a threaded into the ends of said pins 34 and shouldered against the housing 12. The contactor faces 35 conform to the curvature of the shaft 21 at the smooth section 31 and may be provided with inserts 36 where the contacts are desired to be spaced intermittently (as shown in Fig. 2). In such an application excellent conduction characteristics are achieved using inserts 36 of silver. However, the whole contactor face 35 may be brought into engagement without inserts 36 in which case the material comprising the contactor blocks 32 and 33 may be selected for excellent conductivity characteristics. The backs 37 and 38 of the contactor blocks 32 and 33 are characterized by angular planal truncations 26 running the full length of the blocks 32 and 33. This makes the blocks 32 and 33 narrower at their bases than at their tops (see Fig. 3). Wedges 39 and 40 are provided, one side 27 of which matches the planal truncation forming the backs 37 and 38 of the contactor blocks 32 and 33. The outer sides 41 and 42 of said wedges 39 and 40 bear slidably against the mating internal wall of the housing 12. Clearance slots (indicated in Fig. 3) are provided in the tops of said wedges 39 and 40 so as to straddle the pins 34 when the wedges are urged upwardly. A base plate 43, made a part of said housing 12 by removable attachment thereto by means of bolts 44, is provided with a plurality of recesses 45 centered beneath the base position of said sliding wedges 39 and 40. Corresponding cups 46 are provided in the base of wedges 39 and 40 to register with the recesses 45. Coil springs 47 are inserted in the recesses 45 and cups 46 which are under compression when the base plate 43 is bolted in position against the housing 12. The springs urge the sliding wedges 39 and 40 into secure contact against the backs 37 and 38 of the contactor blocks 32 and 33. This translates the pressure from the springs 47 to urge the wedges 39 and 40 upward to hold the contactor block faces 35 against the shaft 21 utilizing the mechanical advantage obtained by said wedges 39 and 40. As the faces 35 or inserts 36 wear away the sliding wedges 39 and 40 slide upward, urged by springs 47, maintaining relatively constant and equally distributed pressure against the backs 37 and 38 of said contactor blocks 32 and 33 and consequent even contact with the smooth contact area 31 of the shaft 21.

Springs 47 have been described as one embodiment of urging means which has proven satisfactory in service and most economical installation-wise. It will be understood, however, that hydraulic or pneumatic means, as via power cylinders under equalized pressure can be employed as wedge urging means without a departure from the spirit of the invention.

Resilient lubricant seals 48 and 49 are provided at either end of the housing 12, in engagement against the shaft extensions to prevent contamination of the bearings 17 and 18 from outside dirt, grit, and other foreign material and serve as lubricant retainers. Lubrication is accomplished by packing the housing with grease. Grease fittings may be provided. Insulating liners 50 are inserted in recesses 45 so as to prevent electrical contact through the springs 47 with the housing 12 or base plate 43. Bushings 51 having good wear resistance and insulating properties separate the guide pins 34 from electrical contact with the contactor blocks 32 and 33. An insulating pad 52 is provided to prevent electrical energy loss through the welding machine attachment. Packing is appropriately provided along the coolant circuit to prevent loss of coolant liquid.

The invention has been described with particularity to show a rotating electrode structure of the idling form. It will be understood that an extension of the shaft 21, so as to provide a driven electrode as by power transmission means via a gear train, is also encompassed within the scope of this invention.

*Operation*

In operation, welding current is introduced through the housing 12 to the wedges 39 and 40 and then through the contactor blocks 32 and 33 which are urged against the shaft 21 by means of the spring-loaded sliding wedges 39 and 40. This passes the welding current to the shaft 21 and thence to the rotating electrode 24 so that it is available for seam welding or progressive welding purposes. The anti-friction bearings 17 and 18 carry the full thrust and radial load upon the shaft 21 so that minimum variation is contemplated or experienced along that smooth portion of the shaft 21 utilized for contact. The anti-friction bearings 17 and 18, being insulated against gapping or arcing from the housing 12, are relatively free from pitting or damage often experienced in anti-friction bearing installations within resistance welding equipment. By reason of the positioning of the contactors 32 and 33 coolant jackets 13 need not run completely about the housing 12 and space limitations are diminished by closing the housing by base plate 43. Circulating coolant through the shaft 21 is conveniently accomplished by use of a coolant tube 28 attached through the cored shaft 21 and extending therefrom.

By reason of the simplicity in construction, exemplified by the removable base plate 43 and step-down shaft 21, rapid disassembly for service or replacement of parts is accomplished. By reason of the self adjusting character of the wedges 39 and 40 a constant contact pressure is maintained independently of any load bearing problem so as to materially extend the life of the contacting surfaces.

Thus, light or heavy welding pressures may be applied to the rotating electrode 24 without any variation in the uniformity of contact pressures between electrode contacting surfaces.

Having thus described the invention illustrated, refer-

We claim:

1. In a rotating resistance welding electrode structure having coolant circulated through the shaft, the combination including: a housing; a shaft therethrough; frictionless bearings at either end of said housing; a smooth contact area on said shaft intermediate said bearings; contactor blocks between said bearings and bearing against said smooth contact area; guide pins positioning said contactor blocks; sliding wedges in operable contact with the backs of said contactor blocks; means urging said wedges against the backs of said contactor blocks.

2. In a rotating resistance welding electrode structure having coolant circulated through the shaft, the combination including: a housing; a shaft therethrough; a base plate closing said housing; frictionless bearings at either end of said housing; a smooth contact area on said shaft intermediate said bearings; contactor blocks between said bearings and bearing against said smooth contact area; guide pins through said housing and said contactor blocks aligning the position of said contactor blocks; sliding wedges between said contactor blocks and said housing; means resiliently urging said wedges into forcible contact against the backs of said contactor blocks.

3. In a rotating resistance welding electrode structure having coolant circulated through the shaft, the combination including: a housing adapted for attachment to a welding machine and provided with a coolant jacket; a shaft therethrough; a removable base plate closing the bottom of said housing and having aligned cylindrical recesses along either side thereof; insulated frictionless bearings in either end of said housing and carrying said shaft; a smooth contact area upon said shaft intermediate said bearings; a pair of cradle-like contactor blocks between said bearings; current conducting inserts upon the faces of said contactor blocks and bearing against said smooth contact area; insulated guide pins through said housing and said contactor blocks transversely of said shaft and above said shaft for aligning the position of said contactor blocks; sliding wedges between said contactor blocks and said housing having cups in the base portions thereof registering with said recesses in said base plate; coil springs in said cups and registering recesses resiliently urging said sliding wedges into forcible contact against the backs of said contactor blocks.

4. In a rotating resistance welding electrode structure having coolant circulated through the shaft, the combination including: a housing adapted for attachment to a welding machine and provided with a coolant jacket; a shaft therethrough; a removable base plate closing the bottom of said housing and having aligned cylindrical recesses along either side thereof; insulated frictionless bearings in either end of said housing and carrying said shaft; a smooth contact area upon said shaft intermediate said bearings; a pair of cradle-like contactor blocks between said bearings and bearing against said smooth contact area; insulated guide pins through said housing and said contactor blocks transversely of said shaft and above said shaft for aligning the position of said contactor blocks; sliding wedges between said contactor blocks and said housing having cups in the base portions thereof registering with said recesses in said base plate; and means in said cups and registering recesses resiliently urging said sliding wedges into forcible contact against the back of said contactor blocks.

5. In a rotating resistance welding electrode structure having coolant circulated through the shaft, the combination including: a housing adapted for attachment to a welding machine and provided with a coolant jacket; a shaft therethrough; a removable base plate closing the bottom of said housing and having aligned cylindrical recesses along either side thereof; insulated frictionless bearings in either end of said housing and carrying said shaft; a smooth contact area upon said shaft intermediate said bearings; a pair of cradle-like contactor blocks between said bearings and bearing against said smooth contact area; insulated guide pins through said housing and said contactor blocks transversely of said shaft and above said shaft for aligning the position of said contactor blocks; sliding wedges between said contactor blocks and said housing having cups in the base portions thereof registering with said recesses in said base plate; coil springs in said cups and registering recesses resiliently urging said sliding wedges into forcible contact against the backs of said contactor blocks.

References Cited in the file of this patent

UNITED STATES PATENTS

| | | |
|---|---|---|
| 2,529,634 | Sciaky | Nov. 14, 1950 |
| 2,636,066 | Sciaky | Apr. 21, 1953 |